United States Patent Office 3,448,174
Patented June 3, 1969

3,448,174
EPOXIDIZED, HYDROXYLATED AND
MALEATED EPDM
Frederick C. Loveless, Oakland, and Robert J. Kelly,
Montville, N.J., assignors to Uniroyal, Inc., a corporation of New Jersey
No Drawing. Filed Mar. 16, 1965, Ser. No. 440,278
Int. Cl. C08f 1/60, 15/40, 29/50
U.S. Cl. 260—878                                6 Claims

ABSTRACT OF THE DISCLOSURE

EPDM terpolymer rubber is reacted with a peroxy acid to produce epoxidized polymer (EEP) which can be cured with $BF_3$ etc. Treatment of EEP with strong mineral acid yields hydroxylated polymer (HEP) which is curable with diisocyanates. HEP treated with maleic anhydride yields maleated polymer (MEP), cross-linkable with metal oxides. Useful casting systems are made by mixing MEP with styrene or other copolymerizable monomer, and curing with peroxide.

---

This invention relates to the chemical modification of unsaturated polymers; more particularly it relates to the epoxidation, hydroxylation, maleation, or other chemical modification of such polymers, as well as to the copolymerization of the maleated material with unsaturated monomers. The invention also relates to the chemically modified polymers so obtained, and to the curing of such modified polymers, and to the cured products so obtained.

In one important aspect the invention has reference to the chemical modification of unsaturated polymers derived from at least two alpha-monoolefins and a least one copolymerizable diene. Such polymers are herein referred to as "EPRD." Usually at least one of the alpha-monoolefins is ethylene while the other is propylene or a higher olefin. Frequently the copolymerizable diene is dicyclopentadiene, 1,4-hexadiene, 1,5-cyclooctadiene, 5-methylenenorbornene-2, or the like. Such non-conjugated dienes render the copolymers unsaturated. Ordinarily the polymers used in the invention are unsaturated rubbery terpolymers of ethylene, propylene and such a diene. The weight ratio of ethylene to propylene in the copolymer is usually from 20/80 to 80/20, preferably between 35/65 and 65/35; the diene content of the copolymer may be from about 3% to about 20%, by weight.

We are aware that it has previously been known to epoxidize partially a low molecular weight polybutadiene to make resins, known as Oxiron resins, which may then be cured through the epoxide group. The Oxiron resins may be blended with polyesters (Technical Bulletin No. 4, Oxiron-Polyester Alloys, Food Machinery Corporation), with rubber in a sulfur cure (Technical Information Sheet No. 47, Oxiron-Rubber Alloys, FMC), with styrene and maleic anhydride (Technical Bulletin No. 3, Organic Acid and Anhydride Curing Possibilities With Oxiron Epoxy Resins, FMC), or cured with anhydrides alone (last reference).

We are also aware of U.S. Patent 3,076,779 issued to Cerniuk (Esso Res. & Eng.) which describes modification or butyl rubber with an aldehyde to give "hydroxylated" rubber. The hydroxyl rubber was subsequently graft-copolymerized with vinyl monomer to give a sulfur-curable polymer.

The present invention, in contrast, concerns modifications of unsaturated terpolymer rubber (EPRD) of the kind described, particularly ethylene-propylene-dicyclopentadiene terpolymer, such that substituent epoxy or hydroxy or maleate groupings are introduced into the polymer structure, thus providing loci for cross-linking reactions and graft-copolymerization. Specially of interest are liquid or near-liquid compositions which may or may not contain polymerizable monomers and are curable to useful rubbers or plastics. These systems are characterized by several advantages:

(a) Because of the essentially completely hydrocarbon nature of the hydrocarbon spines, the polymers are very resistant to hydrolysis and aging (oxidation).

(b) The maleated rubber-and-monomer system is particularly versatile. Different kinds of en-products are attainable by changing the ratio of rubber to monomer; for example:

| Pts. rubber | Pts. styrene | Product |
|---|---|---|
| 1 | 1 | Rubbery plastic. |
| 1 | 2 | Flexible plastic. |
| 1 | 3 or more | Rigid plastic. |

(c) Differences in properties are also attainable by variations in molecular weight of the parent compound to be modified, use of a variety of combination of monomers, and choice of different parent molecules for modification.

(d) In the maleated rubber, there is a pendant carboxyl group which produces increased adhesion to metals, etc.

The uses of these systems are many:
 (a) Rocket binders
 (b) Caulking compounds
 (c) Metal and fabric coatings
 (d) Casting resins
 (e) Plasticizers for resins In describing the invention the preparation of the epoxy rubber, the hydroxy rubber and the maleated rubber will be detailed. The chemical modifications may be represented as follows:

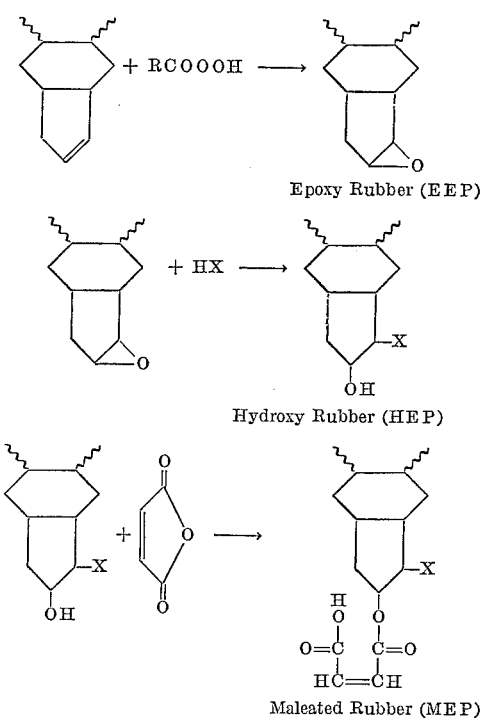

Epoxy Rubber (EEP)

Hydroxy Rubber (HEP)

Maleated Rubber (MEP)

In the structural formulas shown the olefin copolymer chain is represented by the wavy line. Attached to the main polymer chain at intervals there is a side grouping containing the double bond remaining after the copolymerization. In the particular case shown the unsaturated side grouping is the bicyclic residue of dicyclopentadiene, but it will be understood that the side grouping need not be cyclic, but may be an open chain, as in the case when 1,4-hexadine, for example, is used as the diene—the side grouping being in such case an alkenyl group.

Thus, the chemically modified polymers of the invention may be characterized as copolymers of at least two different olefins (usually ethylene and propylene) with at least one copolymerizable non-conjugated diene, in which one of the double bonds of the diene is substituted with an epoxy group, an hydroxy group, or a maleate group. It is believed that one of the double bonds of the diene monomer operates in the copolymerization with the ethylene and propylene to form the EPRD polymer chain, while the other double bond remains available to confer unsaturation on the EPRD. It is this remaining double bond which is epoxidized, hydroxylated, or maleated in accordance with the invention.

In a particularly preferred aspect the invention provides new liquid casting systems based on chemical modification of existing unsaturated hydrocarbon polymers (EPRD). These polymers have been modified in such a way as to be curable by non-sulfur systems or to be copolymerizable with added monomers such as styrene.

Accordingly, in one aspect the invention is directed to a terpolymer of ethylene, propylene, and a diene having an epoxy group attached at the location of the double bond remaining after copolymerization, that is, the olefinic group has been converted to an oxirane group.

Another form of the invention is concerned with a terpolymer of ethylene, propylene and a diene, wherein the olefinic group remaining after copolymerization is converted to a hydroxyl function, which may take the form of a halohydrin function (that is, a halogen atom [e.g., chlorine, bromine] and a hydroxyl group) or a glycol function (that is, two hydroxyl groups) depending upon the conditions of the hydroxylation as will be explained in more detail below.

In another embodiment the invention provides a terpolymer of ethylene, propylene and a diene in which a maleic acid residue is attached in the configuration of a half ester at the former site of the double bond of the polymer.

In particular, the invention provides:

(1) An epoxidized ethylene-propylene-dicyclopentadiene terpolymer (EEP). Such polymers are curable through the epoxide groups, using standard techniques. They are prepared by treating the unsaturated rubber with a peroxy acid. Such modified polymers are also capable of reacting with a wide variety of reagents to produce chemically modified rubbers.

(2) A hydroxylated polymer (HEP) capable of being cured by such agents as diisocyanates. This polymer may be prepared by treating the epoxy rubber (EEP) with an acidic agent such as HCl to open the epoxide ring, or it may be prepared by direct hydroxylation of the EPRD.

(3) A maleated polymer (MEP) prepared by treating the hydroxy rubber (HEP) with maleic anhydride. This material is curable with diisocyanates, metal oxide or diamines.

(4) Graft copolymers of the maleated rubber MEP with suitable monomers such as styrene. These copolymers, after curing, are materials ranging in properties from a rubbery material to a rigid plastic, depending on the ratio of maleated rubber to comonomer. The mixtures of MEP and monomer are curable by free radical agents in a manner similar to existing unsaturated polyester resins.

The EEP, HEP and MEP derived from any given EPRD retain the physical character of the original polymer. One can, therefore, vary the nature of the product from a pourable polymer of low molecular weight to a rubbery polymer of high molecular weight by choice of the original EPRD.

The epoxidized polymer is made by subjecting the starting unsaturated terpolymer—i.e., the EPRD—(usually ethylene-propylene-dicyclopentadiene) to the action of any suitable conventional epoxidizing agent. Conveniently the epoxidation is carried out in solution in a conventional inert volatile organic solvent for the rubber. For example the solvent may be a hydrocarbon, such as an aliphatic or cycloaliphatic hydrocarbon, e.g., hexane, cyclohexane, etc., or an aromatic hydrocarbon, e.g., benzene, toluene, and the like, or a halogen-substituted hydrocarbon, e.g., dichloroethylene. The concentration of the rubber in the solvent is in no way critical, and it may be mentioned by way of non-limiting example that solutions containing 5% or less to 40% or more may be used. The epoxidizing agent is frequently a peroxy acid, especially an organic peroxy acid, either aliphatic, as in peroxyacetic acid, or aromatic, as in peroxybenzoic acid. The reaction conditions are not critical. The reaction proceeds at room temperature, but heat (e.g., 50–150° C. or higher) may be applied if desired to speed it up. The amount of epoxidizing agent is not critical, and the optimum amount in any given case will depend upon such variables as the particular epoxidizing agent used, the degree of epoxidization desired, the particular starting rubber used (especially the degree of unsaturation of the starting rubber), and the like. Usually it is desirable that the amount of epoxidizing agent be roughly equivalent to the unsaturation in the starting rubber as determined by iodine number, although smaller amounts, e.g., 0.1 molar equivalent (especially when only partial epoxidation is desired), or larger amounts (e.g., 2–5 or more molar equivalents), may of course be used if desired. No special manipulation of the reaction mixture is necessary; for example, it is sufficient to simply stir the mixture, say for a period of 2–10 hours. The resulting epoxidized polymer (EEP) may be recovered from the reaction solution in any suitable manner, for example by precipitating it with a non-solvent (e.g., ethanol). The infrared spectrum of the dried EEP rubber shows absorption due to epoxide (837 cm.$^{-1}$), and in the typical case essentially no residual absorption due to unsaturation. A solution of the epoxy rubber is gelled immediately by the addition of boron trifluoride, whereas before treatment with the peroxy acid, no gelation is effected by $BF_3$.

To prepare the hydroxy rubber (HEP) of the invention, the epoxy rubber (EEP) is dissolved in an inert organic solvent, as described above in connection with the preparation of the EEP. The solution is then subjected to conditions which promote epoxide ring opening by acid. The preferred method is to treat the solution with dry gaseous HCl, which results in rapid formation of HEP. Another convenient way of accomplishing this is to add a strong acid, such as an aqueous solution of hydrochloric acid (containing, for example 5 to 37% of HCl), or other acid such as HBr, $H_2SO_4$ or $H_3PO_4$. The amount of acid employed is not critical, and will depend among other things not only upon the particular acid and HEP, but also on the degree of conversion of epoxide to hydroxyl desired in a given case. It is ordinarily desirable to employ an excess of acid relative to the amount of epoxide. The hydrolysis will proceed at room temperature, but rather slowly, and for this reason we usually prefer to warm the solution, say to a temperature of 60–80° C. Of course, higher temperatures (e.g. 100–150° C. or more) may also be used if desired. At temperatures of the order of 60–80° C. standing overnight is usually sufficient to convert essentially all the epoxide to hydroxyl (as indicated by infrared).

The hydroxy rubber (HEP) may also be prepared directly from the EPRD, that is, it is not necessary to prepare separately and isolate the EEP before converting it into HEP. For this purpose the EPRD is dissolved in the solvent and treated simultaneously with the previously described epoxidizing agent (peroxy acid) and epoxide-ring-opening agent (e.g., gaseous HCl). This results in opening of the epoxide rings first formed to give the hydroxy rubber (HEP). The proportions of reagents and the reaction conditions for this direct preparation of HEP from EPRD may be the same as previously described for successive epoxidation and hydroxylation, but it is a distinct advantage of this direct preparation that the reaction proceeds more readily, that is, the process can be completed in a shorter time and at lower reaction temperatures than in the preparation from EEP. Thus, the direct preparation of HEP from EPRD is readily accomplished by reacting at 0 to 100° C. for 0.2 to 20 hours.

In the production of hydroxy rubber (HEP) from high molecular weight epoxy rubber (EEP) (that is, epoxy rubber having a molecular weight of, for example, about 20,000 or more) the product sometimes becomes partially cross-linked. This gelation is not encountered when low molecular weight EEP (e.g., of a molecular weight of 10,000 or less) used. In the preparation of HEP of high molecular weight the cross-linking can be minimized by employing the described direct or one-step method, that is, by simultaneous treatment of EPRD with the epoxidizing agent and the ring-opening agent. This is a further advantage of the direct method of hydroxylation.

When the hydroxylation is carried out with anhydrous hydrogen halide, the product has a halohydrin function attached at the double bond site, as represented in the structural formula set forth previously. When the hydroxylation is carried out with aqueous acid, the product contains not only material with the halohydrin function but also material with glycol function, that is, some of the product is made up of material having two hydroxyl groups at the former site of the double bond. Both of these materials are referred to herein as products with hydroxyl function.

To prepare the maleated rubber (MEP), we provide first a dried solution of the hydroxy rubber (HEP) as described previously. The solution is then treated with maleic anhydride. The amount of maleic anhydride may vary, depending on such factors as the hydroxyl content of the HEP, the amount of HEP, and especially the degree of maleation desired. Usually an amount of maleic anhydride of from at least 0.1 mole up to 2 moles is used per equivalent of hydroxyl present in the polymer. Almost invariably we use an amount of maleic anhydride at least equivalent to the original unsaturation of the EPRD (assuming that substantially all of the double bonds became epoxidized and substantially all of the epoxy groups became hydrolyzed). Usually we use an excess, say a 50% excess (and we can use a greater excess, say 100% excess or more). At ambient temperatures the maleation takes place at a moderate rate. At slightly elevated temperatures, the reaction rate is greater e.g., 60–80° C. Higher temperatures (e.g., 100–150° C. or more) can also be used if desired. Thus, if a 50% excess of maleic anhydride (based on the original unsaturation) is added to HEP in benzene, and the mixture is warmed at 60–80° C. overnight, the infrared absorption characteristics of the recovered MEP indicate formation of ester linkages at the expense of free hydroxyl.

The maleated rubber can also be prepared directly from the EPRD without going through the steps of separately preparing and isolating the hydroxy rubber. This direct or one-step preparation may be carried out by treating a dry solvent solution of the EPRD with epoxidizing agent, ring-opening agent and maleic anhydride all at one time in the reaction vessel. The reaction conditions may be the same as indicated for the multi-step preparation, but the reaction in general proceeds with such facility that the formation of MEP is complete in a few hours at ambient conditions. Like the direct hydroxylation, the direct maleation has two distinct advantages, namely, the process can be completed in a shorter time and at a lower reaction temperature (e.g., 0° to 100° C. in 0.2 to 20 hours), and also the problem of gelation or cross-linking (which is sometimes encountered in the production of MEP from high molecular weight HEP) can be minimized.

Concerning the expoxidized EPRD, that is, the EEP, this material is remarkably useful in itself, even without conversion of HEP or MEP. Thus, the epoxy groups in the EEP render the rubber curable or cross-linkable with the various reagents known to be effective with polymers containing epoxy groups. Such reagents include, for example, $BF_3$, $BF_3$ complexes, $AlCl_3$, $AlBr_3$, $SnCl_4$, etc., mineral acids (HCl, HBr, $H_2SO_4$, etc.), and carboxylic acids such as maleic, adipic, phthalic, etc. These reagents may be used to cure the EEP in a solid state, or in solution if added in amounts less than equivalent to the epoxy groups. If these acids are added in amounts more than equivalent to the epoxy groups, the gelation will be suppressed in favor of a ring opening reaction. Thus, solution or cements of EEP can be gelled (cured) rapidly with a reagent such as boron trifluoride even at room temperature. Valuable casting and coating compositions are obtainable in this way.

The epoxy groups of EEP are susceptible to a wide variety of reactions so that the polymer chain can be modified into a great number of functional groups. Typical examples of such reactions are listed in volume I of Heterocyclic Compounds (edited by R. C. Elderfield), John Wiley and Sons, Inc., New York, 1950, chapter 1.

The HEP, that is, the hydroxy EPRD, similarly is useful for many other purposes besides making MEP. For example, it can be cured by reaction with a diisocyanate, such as toluene diisocyanate, or a dianhydride such as pyromellitic anhydride.

Perhaps most remarkable for its versatility as to uses is the maleated EPRD (MEP). Thus, the MEP may be mixed with one or more polymerizable monomers, such as styrene or its homologs or substitution (e.g., chlorinated) products; acrylonitrile, methacrylonitrile; methyl and ethyl acrylates and methacrylates and their homologs; vinyl acetate; vinylpyridine; and divinylbenzenes and other monomers containing more than one double bond, as well as unsaturated polyester resins such as maleic alkyds and are like. Liquid monomers, in which the MEP is dissolved, are especially suitable, particularly from the standpoint of providing interesting casting liquids or pastes. The proportion of MEP to monomer may vary widely, for example from 5:95 to 95:5 (by weight). Such mixtures are useful articles of commerce and may be copolymerized with the aid of conventional polymerization catalysts, for example free-radical-generating agents, notably inorganic or organic peroxides or hydroperoxides, azo compounds, and the like, as listed for example in Schildknicht, Vinyl and Related Polymers, John Wiley and Sons, Inc., New York, 1952, pp. 77, 78.

Another remarkable property of the MEP resides in its ability to be cross-linked with reagents reactive toward carboxylic acids, for example basic metal oxides such as MgO, CaO, $Na_2O$, organic diisocyanates such as hexamethylene diisocyanate, toluene, diisocyanates and isocyanate-terminated polyesterdiols and polyetherdiols; and organic polyamines such as hexamethylene diamine, phenylene diamines, p,p'-diamodiphenyl methane. This may be accomplished by milling the solid MEP with such a reagent or by blending solutions of MEP with such reagents, in proportions of, for example, from 1–20% of reagent (on the weight of MEP), and thereafter subjecting the mixtures to ambient temperature or elevated temperature (e.g., 150–200° C.) to effect cross-linking, with the optional addition of a catalytic material such as a tertiary amine in the case of reactions involving diisocyanates, e.g., the addition of 1,4-diazobicyclo [2.2.2] octane.

The instructions given above can be varied considerably as desired, depending on the particular materials used and the objects sought. In any given case those skilled in the art will readily be able to determine optimum conditions for any particular purposes. The amount of functionality, the molecular weight of the substrate polymer, and the chemical nature of the substrate polymer will all have an effect on the results obtained in a given case. In addition to the ethylene-propylene-dicyclopentadiene substrate polymer referred to specifically, any other such unsaturated terpolymer, such as are described in copending application of Matthews and Kelly, Ser. No. 358,371, filed Apr. 8, 1964, may be used, as well as numerous other unsaturated polymers of different nature.

Following are some specific examples of the practice of our invention. In the examples all quantities and ratios refer to weights unless otherwise indicated.

EXAMPLE 1

Epoxidation of a low molecular weight ethylene-propylene-dicyclopentadiene terpolymer Three hundred grams of a 25% solution of an EPRD (of E/P ratio=61/38, iodine number 15.9, and I.V. at 135° C. in tetralin=0.50) in benzene was placed in a 3-necked, one-liter flask equipped with stirrer, thermometer and 125 ml. dropping funnel. The amount of terpolymer used contains approximately .045 mole of unsaturation. The solution was cooled to 7.5° C., and dropwise addition of 6.2 g. (.045 mole) of peroxybenzoic acid contained in 92 ml. of a chloroform solution was started. The addition required 10–15 minutes at a rate regulated to maintain the temperature below 10° C. The solution was then allowed to warm gradually to room temperature, and was stirred overnight. The epoxidized rubber was recovered by precipitation in methanol followed by drying in a vacuum oven. Infrared analysis of the product showed a very intense absorption at ca. 835 cm.$^{-1}$ due to the epoxide grouping. The original absorptions at 1610 cm.$^{-1}$ and 3045 cm.$^{-1}$, caused by the presence of unsaturation, had disappeared.

Five drops of $BF_3$ etherate were added to a few ml. of chloroform and to this was added, with stirring, 25 ml. of a cement of the above epoxidized rubber. Gelation was so rapid that complete mixing could not be accomplished. A similar test on a cement of the original unepoxidized EPRD failed to give any gelation.

EXAMPLE 2

Partial epoxidation of a higher molecular weight EPRD

In this experiment, 50 grams of an EPRD (wt. ratio E/P=60/40; I.V.=2.23 in tetralin at 135° C.) was dissolved in 950 grams of benzene. This was a high molecular weight rubber having an iodine number of 22, and containing .043 mole of unsaturation in the 50 gms. To the cement (cooled to 5° C.) was added 2.95 g. (.0216 mole) of peroxybenzoic acid contained in 46 ml. of a chloroform solution. The reaction mixture was stirred 8 hours at ice-bath temperature, then overnight at room temperature. After this, just as in Example 1, 25 ml. of the cement was quickly gelled with $BF_3$ etherate, showing that epoxidation had occurred. This was confirmed by infrared. It should be noted that peroxybenzoic acid equivalent to only one-half of the unsaturation was used, leaving half of the double bonds intact and available for curing with sulfur.

EXAMPLE 3

Hydrolysis of epoxidized EPRD with aqueous HCl

Fifty-three grams of epoxidized EPRD from Example 1, as a 25% cement in benzene, was mixed with 50 ml. of concentrated HCl and 100 ml. of distilled water in a one-liter, 3-necked reaction flask equipped with stirrer and condenser. The reaction mixture was heated to reflux and kept there overnight. Sodium chloride was added to separate the layers, and the organic phase was added to an equal volume of acetone to precipitate the polymer. The dried polymer showed strong hydroxyl peaks at 3600 and 3450 cm.$^{-1}$ in the infrared, and complete absence of an epoxide peak at 835 cm.$^{-1}$.

The hydroxyl number of the resultant polymer was 19 and the chlorine content was 1.35% (Theoretical for complete reaction: Hydroxyl No.=35; percent Cl= 2.2.)

EXAMPLE 4

Reaction of hydroxylated EPRD with maleic anhydride

Fifty grams of hydroxylated EPRD, obtained as described in Example 3, and containing about .03 equivalent of hydroxyl in this weight of rubber, was dissolved in 400 ml. of toluene. The solution was heated at reflux in a one-liter, 3-necked, round-bottom flask equipped with stirrer, thermometer, and Dean-Stark trap in order to remove any water present. After all water was removed, 5.88 g. (0.6 equivalent) of maleic anhydride was added and heating was continued for 20 hours. The polymer was then isolated by precipitation in an equal volume of methanol, chopped in a blendor and dried in a vacuum oven. The infrared spectrum of the resultant polymer showed strong carbonyl peaks at 1730 cm.$^{-1}$ (ester) and 1705 cm.$^{-1}$ (acid). The acid number of a sample of the rubber was 9.23. This means approximately one COOH (or ester) per 500 carbon atoms or per 7000 molecular weight.

EXAMPLE 5

Cocure of maleated EPRD and styrene to give a rubber

Forty grams of maleated EPRD, obtained from Example 4, was dissolved in 40 grams of styrene. A 10-gram sample was treated with 2% of methyl ethyl ketone peroxide and a trace of ferric acetyl acetonate. The mixture gelled at room temperature and was then oven-cured at 115° C. for 2 hours. The result was a tough rubbery material.

EXAMPLE 6

Cocure of maleated EPRD and styrene to give a rigid plastic

Forty grams of the blended mixture from Example 5 was mixed with 40 grams of styrene to give an over-all ratio of styrene/rubber of 3 to 1. To this was added 1.2 g. of benzoyl peroxide, and the mix was poured into a "plaque" mold for oven curing. The sample was cured by heating overnight at 50° C. followed by two hours at 100–110° C. The product (which was rather firmly bonded to the ferro-type plates of the mold) was a hard, tough, plastic material. The material had the following properties at room temperatures:

Notched Izod _____foot-pounds__ .38
Rockwell ("R") hardness _____ 68

EXAMPLE 7

Cocure of maleated EPRD with styrene to give a rigid plastic

The procedure was identical to Example 6, except that the ratio of styrene to rubber was 5:1. The properties of the cured material at room temperature were:

Notched Izod _____foot-pounds__ .33
Torsional modulus (R.T.) _____p.s.i__ 224,000
Rockwell ("R") hardness _____ 88

EXAMPLE 8

Cocure of maleated EPRD with styrene to give a flexible plastic

The procedure was identical to Example 6, except that the ratio of styrene to rubber was 2 to 1. The properties of the product were:

Notched Izod _____foot-pounds__ 6.5
Torsional modulus (R.T.) _____p.s.i__ 24,900
Rockwell ("R") hardness (too soft to measure).

Examples 5, 6, 7 and 8 demonstrate the versatility of the maleated EPRD in cocuring with a monomer like styrene. One can produce anything from a rubber to a rigid plastic depending on the ratio of styrene to MEP used. In a like manner one can use other monomers or mixtures of monomers, such as 2-vinylpyridine, homologs or substitution products of styrene, and obtain analogous results.

EXAMPLE 9

Cocure of maleated EPRD with styrene and divinylbenzene

The procedure was identical to Example 8, except that 10% by weight divinylbenzene was added to the 2/1 styrene-rubber blend. The properties were:

Notched Izod _____foot-pounds__ .89
Torsional modulus (R.T.) _____ 102,100
Rockwell ("R") hardness _____ 43

EXAMPLE 10

The procedure was identical to Example 7, except that 10% by weight divinylbenzene was added to the 5-to-1 styrene-rubber blend. The properties of the product were:

Notched Izod _____foot-pounds__ .40
Torsional modulus (R.T.) _____ 257,100
Rockwell ("R") hardness _____ 107

The effect of divinylbenzene is illustrated by comparing the properties of the material produced in this example with that of Example 7.

Examples 9 and 10 demonstrate the effect of adding a monomer containing more than one double bond. The hardness and torsional modulus of the product are increased by the addition of such polyfunctional monomers.

EXAMPLE 11

One-step preparation of HEP from EPRD

Twenty grams of EPRD (wt. ratio $E/P=60/40$, $I_2$ No.=22, I.V. 135° in tetralin=.41) was dissolved in 60 g. of toluene and saturated with HCl for 60 minutes. This amount of rubber is equivalent to 0.014 mole of unsaturation. Then 3.0 g. (.015 mole) of metachloroperoxybenzoic acid was added and allowed to react 30 minutes. The product was flocced in methanol, chopped in a blendor, and dried in a vacuum oven. The infrared spectrum of the product showed formation of hydroxy rubber and complete absence of residual epoxide.

EXAMPLE 12

One-step preparation of MEP from EPRD

Twenty grams of EPRD (wt. ratio $E/P=60/40$, I.V.=2.23 at 135° in tetralin, $I_2$ No.=22) was dissolved in 380 grams of benzene. The solution was cooled to 15° and saturated with gaseous HCl for 30 minutes. Then 3.52 g. of metachloroperoxybenzoic acid was added and the mixture was allowed to react for 30 minutes. Then 2.0 g. of maleic anhydride was added, the reaction mixture was warmed to 45° C., and was then stirred overnight at room temperature. The amount of peroxy acid and anhydride used was equivalent to the unsaturation in the rubber. The polymer was then flocced in methyl alcohol, chopped in a blendor and dried in a vacuum oven. The infrared spectrum of the product was consistent with that expected for MEP.

The 30 minute delay in adding the maleic anhydride is not necessary. In fact it can even be added before the peroxy acid.

Having thus described our invention, what we claim and desire to protect by Letters Patent is:

1. A liquid casting composition curable to a solid state by heating in admixture with a free-radical polymerization initiator comprising a solution of
   (A) a terpolymer of ethylene and propylene in weight ratio of from 20/80 to 80/20 and from 3 to 20% by weight of a copolymerizable non-conjugated diene, in which a single maleic acid residue is attached through oxygen of one carboxyl group of the maleic acid in the configuration of a half-ester at the site of the former double bond of the terpolymer by the successive or simultaneous action of a peroxy acid, a strong mineral acid, and maleic anhydride,
   (B) liquid monomer containing a vinyl double bond copolymerizable with (A) in the presence of a free-radical polymerization initiator.

2. A method comprising mixing a liquid casting composition as in claim 1 with
   (C) a free-radical polymerization initiator, and subjecting the mixture to polymerization conditions in a mold, whereby ethylenic copolymerization of (A) and (B) takes place involving the double bond of the maleic residue to form a solid molded article.

3. A cured molded copolymerizate resulting from the method of claim 2.

4. A method as in claim 2 in which the said non-conjugated diene is dicyclopentadiene.

5. A method as in claim 2 in which the said monomer (B) is selected from the group consisting of styrene, acrylonitrile, methacrylonitrile, methyl acrylate, ethyl acrylate, methyl methacrylate, ethyl methacrylate, vinyl acetate, vinylpyridine and divinylbenzene.

6. A method as in claim 2 in which the said monomer (B) is styrene.

References Cited

UNITED STATES PATENTS

| | | | |
|---|---|---|---|
| 2,660,563 | 11/1953 | Banes et al. | 260—94.7 |
| 2,829,130 | 4/1958 | Greenspan | 260—94.7 |
| 3,042,661 | 7/1962 | Kirshenbaum | 260—94.7 |
| 3,247,284 | 4/1966 | Heiberger et al. | 260—94.7 |
| 3,317,635 | 5/1967 | Osmond et al. | 260—886 |
| 3,342,771 | 9/1967 | Cheritat et al. | 260—94.9 |
| 2,692,892 | 10/1954 | Hillyer et al. | 260—94.7 |
| 2,829,135 | 4/1958 | Greenspan | 260—94.7 |
| 3,261,888 | 8/1966 | Cornell et al. | 260—878 |
| 3,271,477 | 9/1966 | Kresge | 260—878 |

SAMUEL H. BLECH, *Primary Examiner.*

M. J. TULLY, *Assistant Examiner.*

U.S. Cl. X.R.

260—31.8, 33.6, 80.78, 77.5, 78.4